J. B. McHUGH.
DUST COLLECTOR.
APPLICATION FILED JAN. 27, 1917.
1,235,581.
Patented Aug. 7, 1917.
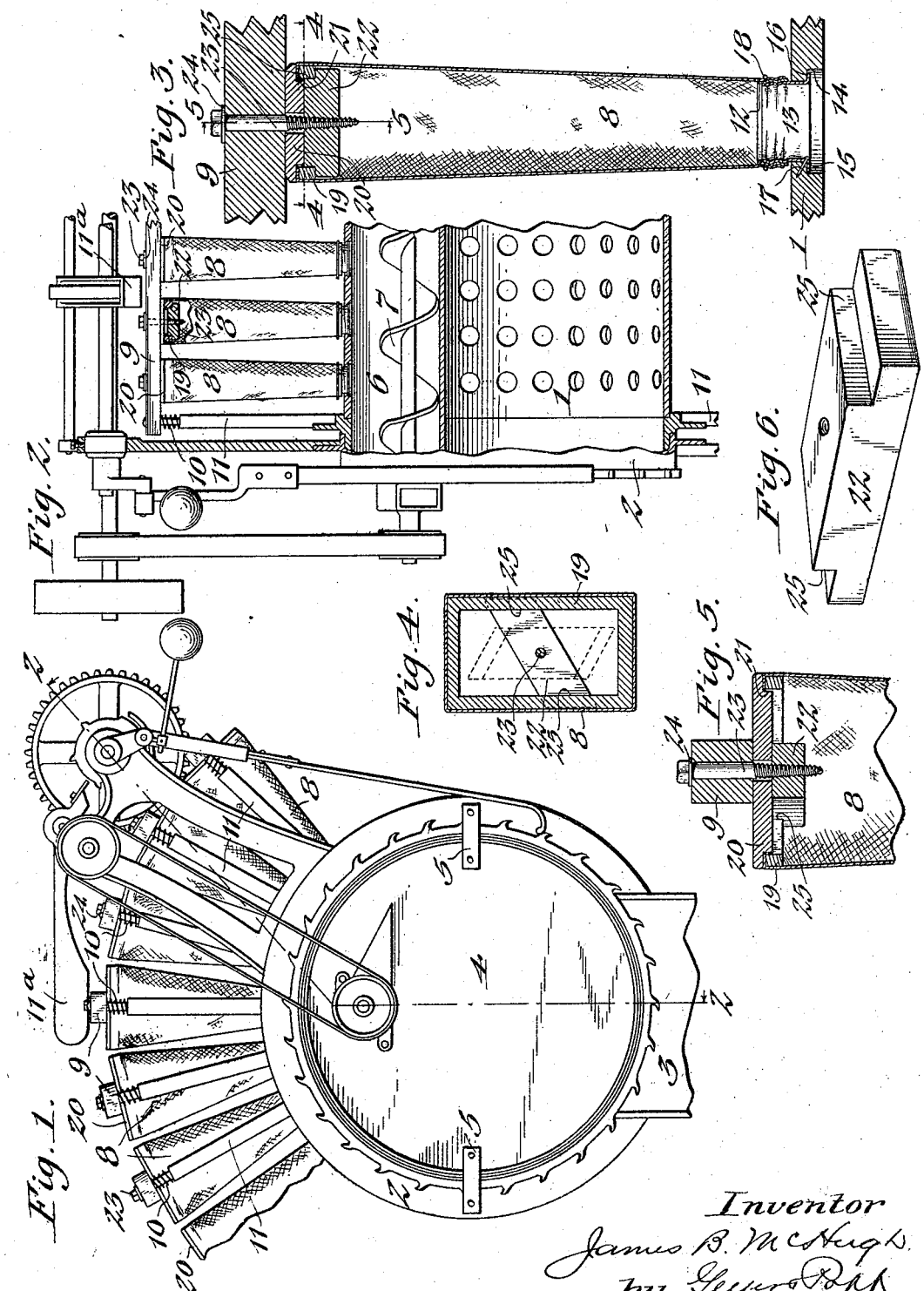
Inventor
James B. McHugh
by Geyer & Popp
Attorneys.

UNITED STATES PATENT OFFICE.

JAMES B. McHUGH, OF LOCKPORT, NEW YORK.

DUST-COLLECTOR.

1,235,581. Specification of Letters Patent. Patented Aug. 7, 1917.

Application filed January 27, 1917. Serial No. 144,880.

*To all whom it may concern:*

Be it known that I, JAMES B. McHUGH, a citizen of the United States, residing at Lockport, in the county of Niagara and State of New York, have invented new and useful Improvements in Dust-Collectors, of which the following is a specification.

This invention relates to the class of dust collectors comprising a rotary horizontal drum, rows of filtering or dust collecting tubes communicating therewith and extending radially therefrom and knocking devices for jarring the tubes as they arrive above a dust receiving chamber in the upper portion of the drum, the dust-laden air being blown into this drum and the several tubes and the dust being intercepted while the air passes through the pores of the tubes.

It is customary to clean these tubes without removal from the machine, by reversing the air current through them. In time, they become clogged with dust to such an extent as to necessitate reversing them and throughly cleaning them with a brush. This requires the use of end fastenings which permit the tubes to be removed and replaced.

One of the objects of my invention is the provision of simple, tight and reliable fastenings for this purpose, which facilitate the removal of the tubes without disturbing others and their ready replacement in the machine.

A further object is to so construct the tube-fastenings as to permit complete reversal of the tubes for thoroughly brushing and cleaning them and so as to prevent wear of the tubes at their inner edges and consequent leakage of dust into the mill.

In the accompanying drawings:

Figure 1 is a fragmentary side elevation of a dust collector embodying the invention. Fig. 2 is a fragmentary longitudinal section thereof on line 2—2, Fig. 1. Fig. 3 is an enlarged longitudinal section of one of the tubes and its end fastenings. Fig. 4 is a horizontal section on line 4—4, Fig. 3. Fig. 5 is a fragmentary vertical section on line 5—5, Fig. 3. Fig. 6 is a perspective view of one of the turn buttons.

Similar characters of reference indicate corresponding parts throughout the several views.

1 indicates the horizontal drum of the machine which is journaled at its ends in the usual fixed rings 2 supported by the customary standards 3, and 4 indicates the fixed heads closing the ends of the drum and fastened to the rings 2 by the brackets 5.

Arranged lengthwise in the upper portion of the drum is the conveyer trough or cut-off chamber 6 containing the conveyer 7. 8 indicates the dust collecting tubes extending radially from the drum and arranged in longitudinal rows, the inner ends of the tubes being attached to the drum and their outer ends to the customary longitudinal bars or supports 9 which are pressed outward by the usual springs 10. These bars slide on the reduced ends of radial supporting arms 11 carried by the ends of the drum and the springs 10 are interposed between shoulders of these arms and the inner sides of said bars 9, in a well-known manner. As the rows of tubes successively pass over the dust-receiving chamber 6, their outer supporting bars 9 are jarred by knockers 11$^a$ to dislodge the dust from the tubes.

The mechanism for driving the drum and the conveyer and for operating the knockers forms no part of my invention and may be of any ordinary or suitable construction.

At its inner end each collecting tube is removably attached to the periphery of the drum 1 by a screw threaded ring 12 secured within the end of the tube and engaging the threaded outer end of a thimble 13 seated in an opening 14 of the drum, as best shown in Fig. 3. This thimble is provided at its inner end with a projecting flange 15 which bears against an internal annular shoulder 16 of said opening, the thimble being held against rotation in the latter by a nail 17 or other suitable means. The screw ring 12 may be secured to the tube by a wire band 18 or other appropriate fastening. By this construction, the inner end of any one of the tubes can be readily detached from the drum by simply unscrewing the ring 12 from the thimble 13, this being done without disturbing or interfering with any of the other tubes. This construction has the further advantage that the inner ends of the cloth tubes do not bear against the edges of the drum-openings and are not exposed to the friction of the blast of dust-laden air, thereby preventing wear or cutting of the tubes at these points and avoiding leakage of dust which is liable to occur where the ends of the tubes are thus exposed and their fastenings are such as to permit them to turn or twist in the openings. This screw ring and thimble also serve to keep the inner end of the tube fully distended, permitting a thorough cleaning of that end of the tube when the air blast is reversed through it.

At its outer end each filter tube is provided with a skeleton or open frame 19 which is glued or otherwise secured to the tube. This frame may be constructed of wood or other suitable material and is preferably oblong and arranged crosswise of the corresponding bar 9, as shown in the drawings. This rectangular frame is adapted to fit over or against the inner face of a correspondingly-shaped head or plate 20 applied to the inner side of the bar 9, this head being grooved or rabbeted in its edge, as shown at 21, to fit closely into the frame and tightly close the outer end of the tube. The head is clamped to the bar 9 and the tube-frame is detachably secured to the head by a turn-button 22, preferably of wood, provided with a tightening bolt or screw 23. This screw passes through an opening in the bar 9 and its threaded portion engages an opening formed centrally in the turn-button, the head of the bolt bearing against a washer 24 resting against the outer side of said bar and being of square or other suitable form to receive a wrench. If preferred, an ordinary flat-headed wood screw may be used. This button is of the proper dimensions to permit the tube frame 19 to pass over it when the button is in line therewith and to engage under the side bars of the frame when the button is turned at a sufficient angle thereto, as shown by full lines in the drawings. The upper or outer portion of the turn button is reduced at its ends to form shoulders 25 which extend into said frame and are adapted to bear against its side bars when the button is interlocked therewith, to form stops which prevent continued rotation of the button with the screw bolt after the button has been turned to its locking position. For this purpose, said shoulders and the ends of the button are preferably beveled or arranged obliquely to the sides of the button, as illustrated in the drawings.

In attaching the outer end of a tube to one of the bars 9, the button is turned parallel with the head 20 by means of the screw bolt 23, as shown by dotted lines in Fig. 4, there being sufficient friction between the button and the threads of the bolt for this purpose. The frame of the tube is then passed over the button and seated against the rabbeted face of the head, after which the bolt is rotated to turn the button into engagement with the frame. The button rotates with the bolt until its beveled shoulders 25 abut against the side bars of the frame when the button is arrested and tightened against the frame by the continued rotation of the screw bolt. In other words, after passing the frame over the button, but a short forward turn of the screw bolt brings the button into engagement with the frame and a few additional turns of the bolt tighten the button, reliably securing the head 20 to the longitudinal bar 9 and the adjacent end of the tube to the head by one and the same fastening, producing a comparatively simple and inexpensive fastening device.

To detach the outer end of the tube from the bar 9, it is only necessary to give the screw bolt a sufficient number of backward turns to loosen the turn button 22 and bring it in line with the tube frame 19, to release the latter. Said tube frame is made large enough to allow the screw ring at its other end to pass through it. This permits the tube to be turned inside out throughout its full length, exposing all portions thereof to the cleaning action of the brush.

I claim as my invention:

1. In a dust collector, the combination of a support, a dust-collecting tube having an open frame at its end, a rotary member interlocking with said tube-frame, and tightening means connecting said rotary member with said support.

2. In a dust collector, the combination of a support, a head bearing against said support, a dust-collecting tube provided at its end with an open frame seated against said head, and a rotary member interlocking with said tube-frame and having tightening means connecting it with said support.

3. In a dust collector, the combination of a support, a dust-collecting tube having an open frame at its end, a screw rotatably mounted in said support, and a turn button engaging the threaded portion of said screw and interlocking with said tube-frame.

4. In a dust collector, the combination of a support, a dust-collecting tube provided at its end with an open frame, a turn button arranged to interlock with said frame, an operating and tightening screw for said button rotatably mounted in said support, and stop-means for preventing further rotation of the turn button with said screw after interlocking with said frame.

5. In a dust collector, the combination of a support, a head bearing against said support, a dust-collecting tube provided at its end with an open frame seated against said head, a turn button arranged to interlock with said tube-frame, and a screw passing through said support and said head and engaging the turn button, said button having a stop for preventing its further rotation with said screw after interlocking with said frame.

6. In a dust collector, the combination of a support, a head bearing against said support, a dust-collecting tube provided at its end with an open frame seated against said head, a turn button arranged to interlock with said tube-frame and provided at its end with oblique stop-shoulders arranged to bear against the inner side thereof, and a screw passing through said support and said head and engaging said turn button.

7. In a dust collector, the combination of a support, a head bearing against the inner side of said support and having a rabbeted edge, a dust-collecting tube provided at its end with an open frame removably fitted on said head, a turn button arranged to interlock with said tube-frame and provided with stop shoulders arranged to bear against the inner side of said frame, and an operating and tightening screw for said button passing through said support and said head and engaging the button.

8. In a dust collector, the combination of spaced supports, and a dust-collecting tube detachably secured to said supports, respectively, the tube being provided at one end with an attachment and at its other end with an attaching frame of larger dimensions than said attachment to permit the latter to pass through the frame in reversing the tube.

JAMES B. McHUGH.

Copies of this patent may be obtained for five cents each, by addressing the "Commissioner of Patents, Washington, D. C."